United States Patent
Matsuo et al.

(10) Patent No.: US 9,292,173 B2
(45) Date of Patent: Mar. 22, 2016

(54) NON-TRANSITORY COMPUTER READABLE MEDIUM, INFORMATION PROCESSING APPARATUS AND METHOD FOR MANAGING MULTI-ITEM FILES

(71) Applicants: Yu Matsuo, Nagoya (JP); Jun Yamada, Nagoya (JP); Yoshito Hosoi, Nagoya (JP); Machiko Sakaguchi, Nagoya (JP)

(72) Inventors: Yu Matsuo, Nagoya (JP); Jun Yamada, Nagoya (JP); Yoshito Hosoi, Nagoya (JP); Machiko Sakaguchi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 213 days.

(21) Appl. No.: 14/014,602

(22) Filed: Aug. 30, 2013

(65) Prior Publication Data
US 2014/0082566 A1 Mar. 20, 2014

(30) Foreign Application Priority Data
Sep. 19, 2012 (JP) .................................. 2012-205944

(51) Int. Cl.
*G06F 3/0482* (2013.01)
*H04N 1/00* (2006.01)
*G06F 3/0484* (2013.01)

(52) U.S. Cl.
CPC .......... *G06F 3/0482* (2013.01); *G06F 3/04842* (2013.01); *H04N 1/00453* (2013.01); *H04N 1/00458* (2013.01); *H04N 1/00461* (2013.01)

(58) Field of Classification Search
USPC ......... 715/709, 716, 720, 723, 764, 781, 810, 715/823, 835, 838, 845, 846, 854; 707/E17.021, E17.026, E17.029
See application file for complete search history.

(56) References Cited

U.S. PATENT DOCUMENTS

| | | | |
|---|---|---|---|
| 6,538,698 B1* | 3/2003 | Anderson | 348/333.05 |
| 6,883,140 B1* | 4/2005 | Acker et al. | 715/730 |
| 7,779,358 B1 | 8/2010 | Gupta et al. | |
| 8,115,950 B2 | 2/2012 | Du et al. | |
| 2001/0016859 A1 | 8/2001 | Sekido et al. | |
| 2004/0006746 A1* | 1/2004 | Dow | H04N 1/00384 715/273 |
| 2004/0201692 A1* | 10/2004 | Parulski | G06F 7/30265 348/207.1 |
| 2008/0018952 A1 | 1/2008 | Du et al. | |
| 2008/0152298 A1 | 6/2008 | Ubillos | |

(Continued)

FOREIGN PATENT DOCUMENTS

| | | |
|---|---|---|
| CN | 101606122 A | 12/2009 |
| JP | 2001209632 A | 8/2001 |

(Continued)

OTHER PUBLICATIONS

Feb. 28, 2015—(CN) Notification of First Office Action—App 201310354194.0.

(Continued)

*Primary Examiner* — Linh K Pham
*Assistant Examiner* — Wendy Nicholas
(74) *Attorney, Agent, or Firm* — Banner & Witcoff, Ltd.

(57) ABSTRACT

Dividing or splitting data (e.g., images) of a file may be performed by allowing a user to preview or otherwise view the intended division prior to the splitting of the images in the file into separate files. The division may be shown in a display by visually distinguishing between the designated groups. Visual distinctions may include color filtering, use of a division mark, use of grouping frames, labeling and the like and/or combinations thereof. By allowing a user to view the intended groupings, a user may further cancel designated groupings prior to splitting the images into the separate files.

16 Claims, 12 Drawing Sheets

(56) References Cited

U.S. PATENT DOCUMENTS

| | | |
|---|---|---|
| 2008/0155458 A1 | 6/2008 | Fagans et al. |
| 2008/0155459 A1 | 6/2008 | Ubillos |
| 2008/0225153 A1* | 9/2008 | Fagans ............... G06F 3/0481 348/333.01 |
| 2008/0229248 A1 | 9/2008 | Fagans et al. |
| 2008/0288869 A1 | 11/2008 | Ubillos |
| 2011/0087999 A1 | 4/2011 | Bichsel et al. |
| 2011/0145733 A1* | 6/2011 | Neitz et al. ................ 715/761 |
| 2012/0030566 A1 | 2/2012 | Victor |
| 2013/0125002 A1* | 5/2013 | Spaeth ............... G06F 3/0482 715/731 |

FOREIGN PATENT DOCUMENTS

| | | |
|---|---|---|
| JP | 2004255740 A | 9/2004 |
| JP | 2005143039 A | 6/2005 |
| JP | 2007311915 A | 11/2007 |
| JP | 2008167287 A | 7/2008 |

OTHER PUBLICATIONS

Oct. 26, 2015—(CN) Notification of the Second Office Action—App 201310354194.0.

* cited by examiner

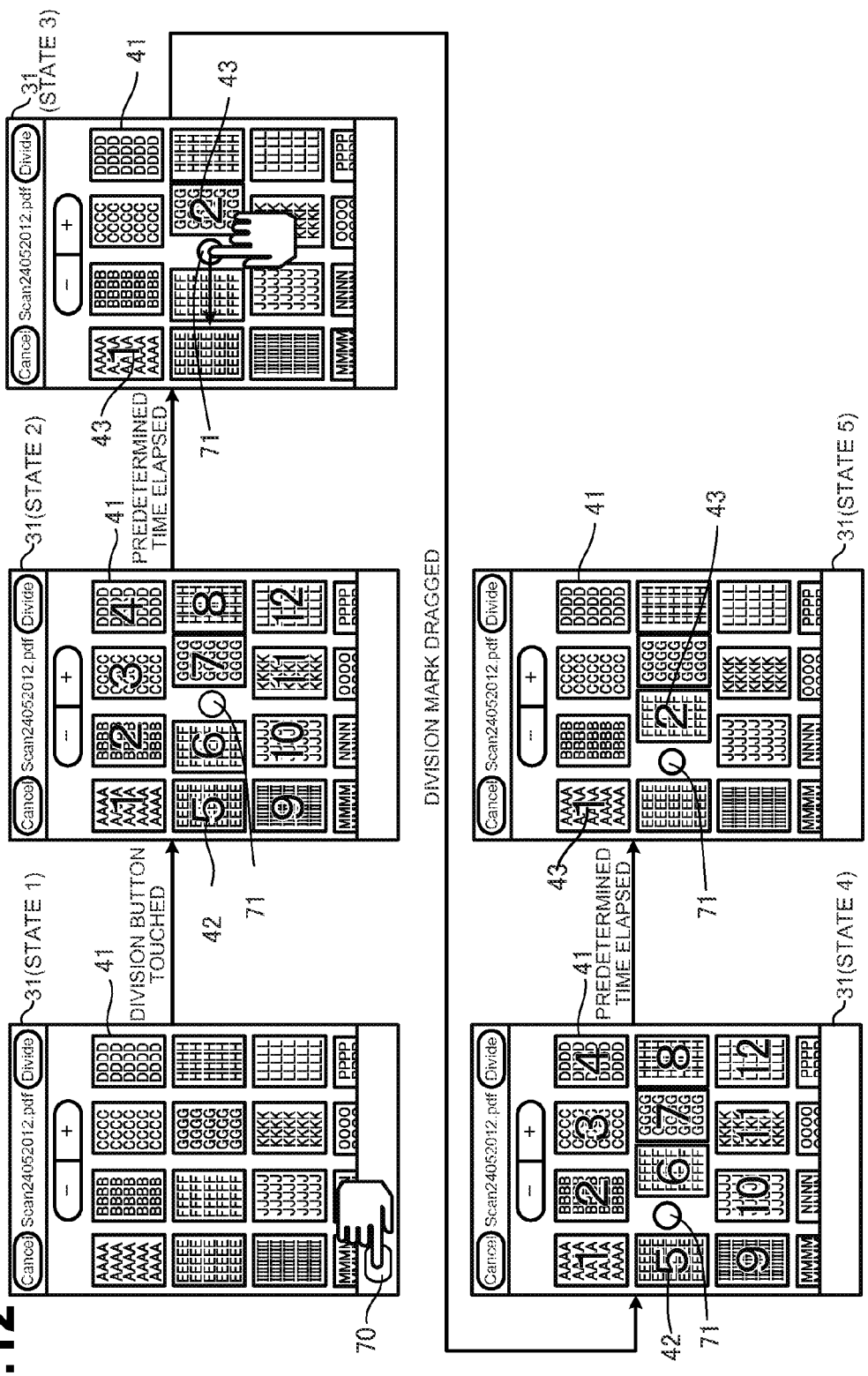

NON-TRANSITORY COMPUTER READABLE MEDIUM, INFORMATION PROCESSING APPARATUS AND METHOD FOR MANAGING MULTI-ITEM FILES

CROSS-REFERENCE TO RELATED APPLICATION

This application claims priority from Japanese Patent Application No. 2012-205944 filed on Sep. 19, 2012, which is incorporated herein by reference.

FIELD OF DISCLOSURE

The disclosure herein relates to a technique of dividing a plurality of images into groups.

BACKGROUND

Such a technique is disclosed to divide or split document data, when the number of pages to be included in an image file for read data is input, based on the input number of pages, and to generate image files that, in total, contain the input number of pages.

After users instruct the division or split of the document data, the users may wish to check a division or split result. Users may wish to check whether a division or split result that is not intended is brought about, for example, with the input of wrong number of pages.

To check the division result, the generated image file needs to be opened according to the above-described technique. Separately from the input of the number of pages, users need to open the image file, which will lead to inconvenience to the users.

SUMMARY

Aspects of the disclosure relate to a technique of dividing or splitting a plurality of images into groups with increased users' convenience.

BRIEF DESCRIPTION OF THE DRAWINGS

Reference now is made to the following description taken in connection with the accompanying drawings.

FIG. 12 is a schematic depicting a thumbnail image matrix display screen according to a seventh example embodiment.

DETAILED DESCRIPTION

Figure 1:
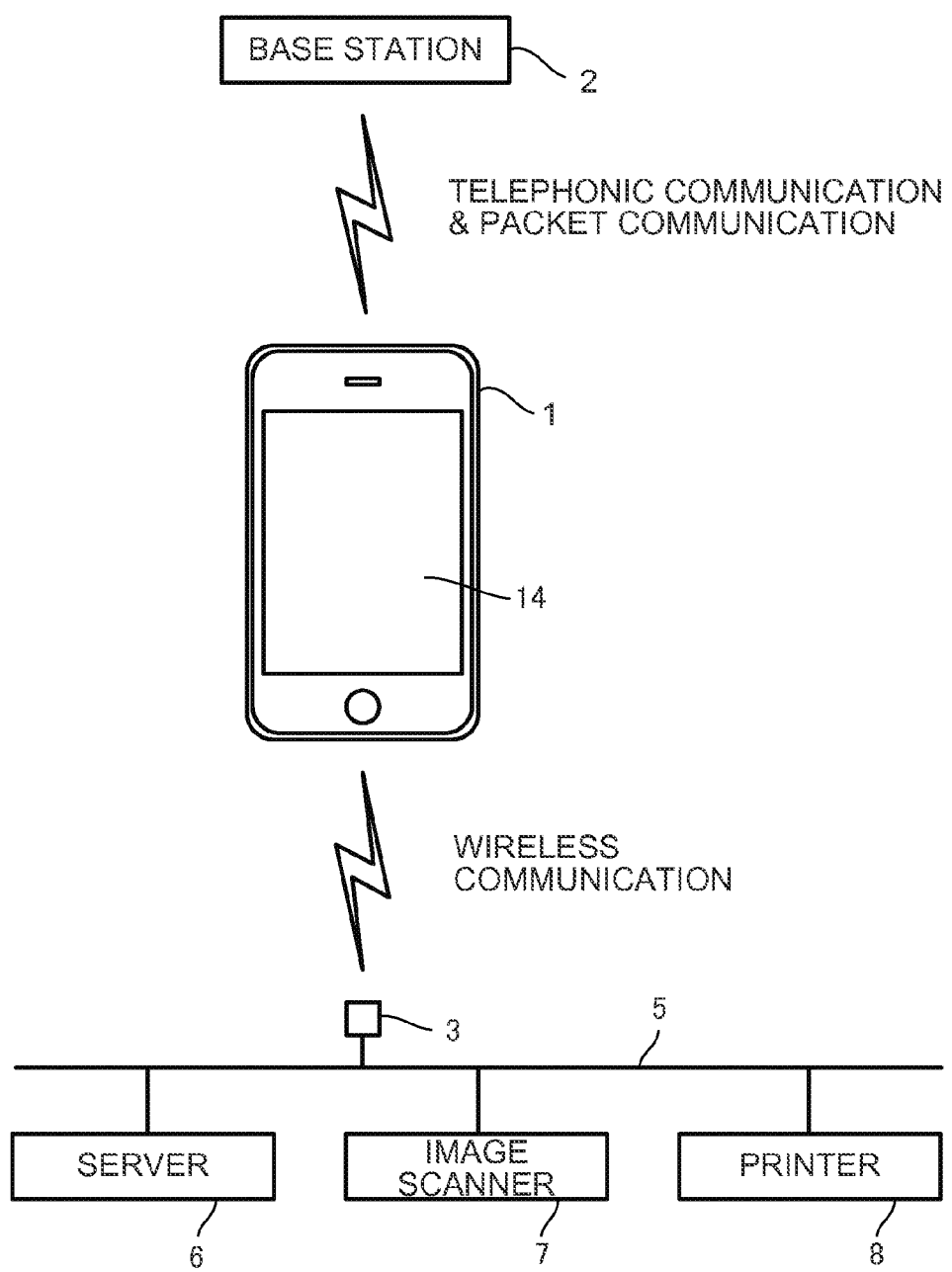
FIG. 1 is a schematic depicting a mobile phone in example embodiments according to one or more aspects of the disclosure.

First to fourth example embodiments will be described in detail herein with reference to the accompanying drawings, like reference numerals being used for like corresponding parts in the various drawings.

<First Example Embodiment>

A first example embodiment will be described referring to FIGS. 1-6.

(1) Mobile Phone

Referring to FIG. 1, an information processing apparatus, e.g., a mobile phone 1, may be a smartphone. The mobile phone 1 may comprise a telephonic communication function and a wireless communication function. The mobile phone 1 may be wirelessly connected to a communication network 5, e.g., a local area network (LAN) or the Internet, via a wireless LAN access point 3.

The mobile phone 1 may be configured to download programs and electronic files from a server 6 connected to the communication network 5. The mobile phone 1 may be configured to perform a display program 22 (refer to FIG. 2) to instruct an image scanner 7 to read or scan a document via the communication network 5. When the image scanner 7 is instructed by the mobile phone 1 to read or scan a document, the image scanner 7 may read the document and generate image data of the document. The image scanner 7 may save or store the generated image data in a Portable Document Format (PDF) file and send the file to the mobile phone 1. The mobile phone 1 may also be configured to perform the display program 22 to instruct a printer 8 connected to the communication network 5 to print an electronic file.

(2) Electrical Configuration of Mobile Phone

Figure 2:
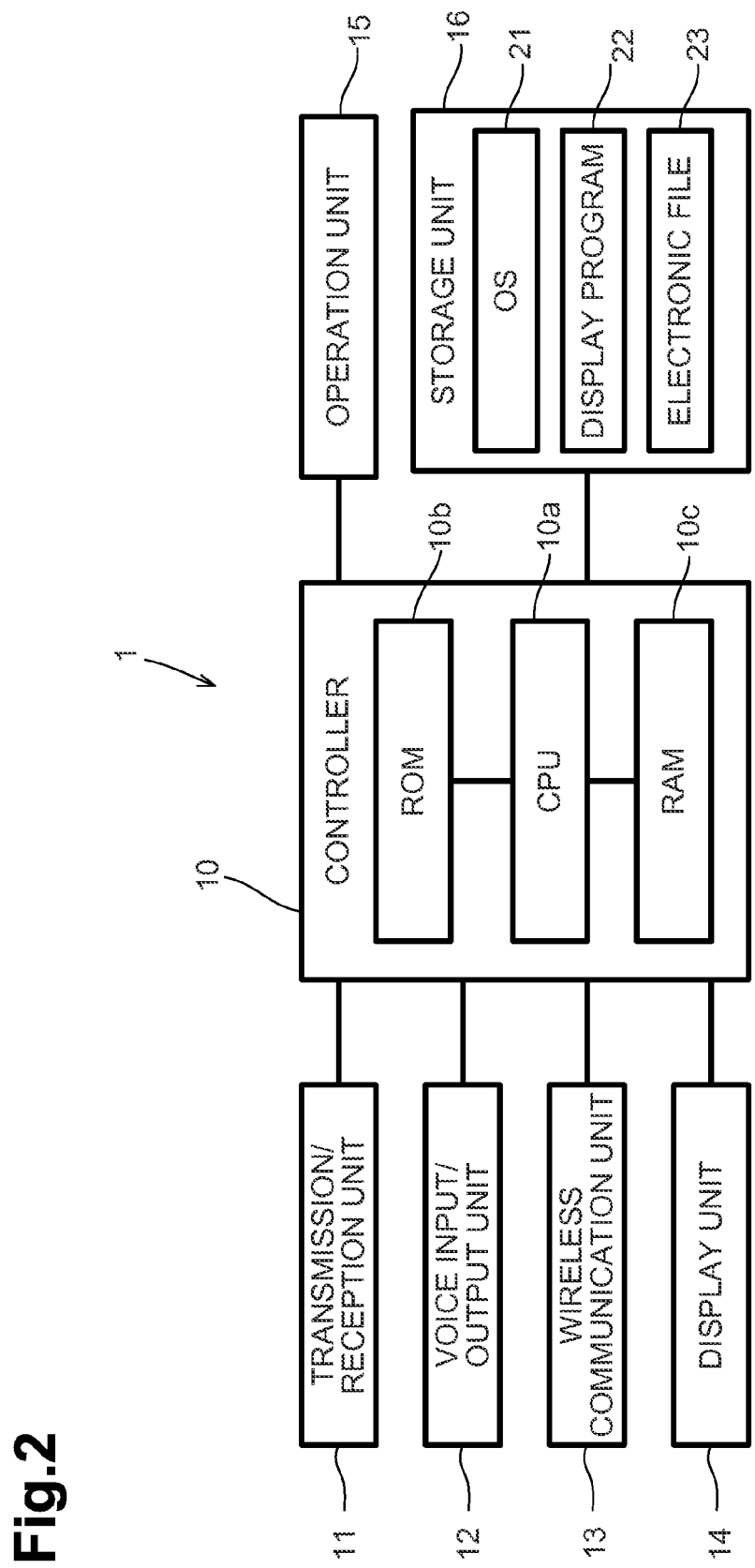
FIG. 2 is a block diagram depicting an electrical configuration of the mobile phone.

Referring to FIG. 2, the mobile phone 1 may comprise a controller 10, a transmission/reception unit 11, a voice input/output unit 12, a wireless communication unit 13, a display unit 14, an operation unit 15, and a storage unit 16.

The controller 10 may comprise a central processing unit (CPU) 10*a*, a read-only memory (ROM) 10*b*, and a random access memory (RAM) 10*c*. The controller 10 may be configured to control components of the mobile phone 1 by executing programs stored in the ROM 10*b* and the storage unit 16. The ROM 10*b* may be configured to store data and programs that may be executed by the controller 10. The RAM 10*c* may be used as a primary storage device for the CPU 10*a* to execute various processing. The controller 10 may be an example of a processor.

The transmission/reception unit 11 may comprise an antenna, a radio frequency (RF) circuit, and a baseband processor. The transmission/reception unit 11 may be configured to transmit voice signals to and receive voice signals from a base station 2, via the antenna. The transmission/reception unit 11 may also be configured to perform packet communication with the base stations 2.

The voice input/output unit 12 may comprise a microphone, a speaker, and a voice processing circuit. A voice signal input by the microphone may be transmitted by the transmission/reception unit 11 to the base station 2. A voice signal received by the transmission/reception unit 11 from the base station 2 may be output by the speaker.

The wireless communication unit 13 may be configured to conform to Wi-Fi™ The wireless communication unit 13 may be wirelessly connected to the communication network 5 via the wireless LAN access point 3. In another embodiment, the wireless communication unit 13 may be configured to make wireless communication in accordance with wireless communication standards other than Wi-Fi™

The display unit 14 may comprises a display device, e.g. a liquid crystal display, and a display driving circuit configured to drive the display device.

The operation unit 15 may comprise a generally transparent touch panel that may cover a display surface of the display device, a control circuit configured to control the touch panel, and various operation buttons. A user may operate the operation unit 15 to input telephone numbers and to operate application programs.

The storage unit 16 may be configured to store various programs (e.g., machine readable instructions) and data using a nonvolatile memory, e.g., a flash memory. The storage unit 16 may be configured to store an operating system (OS) 21, a display program 22, and an electronic file 23 that may be displayed by the display program 22. The electronic file 23 may be, for example, a PDF file, a document file created by a word processor, or an image file, e.g., a Tagged Image File Format (TIFF), storing images.

(3) Display Program

The display program 22 may comprise functions to display thumbnails (e.g., smaller versions) of images stored in an electronic file in a matrix, to receive a designation of a group dividing position from a user in a state in which thumbnail images are displayed in a matrix, to display the images in groups by dividing or splitting the images at an accepted group dividing position, and to save or store images divided into groups in separate files according to the groups.

The display program 22 may also comprise functions to instruct the image scanner 7 to read a document and to instruct the printer 8 to print an electronic file. The detailed description of these functions are omitted herein.

The display program 22 according to the first example embodiment may be configured to divide images into two groups. The display program 22 according to the first example embodiment might not divide the images into three or more groups. The CPU 10a may execute the display program 22.

(3-1) User Interface of Display Program

Figure 3:
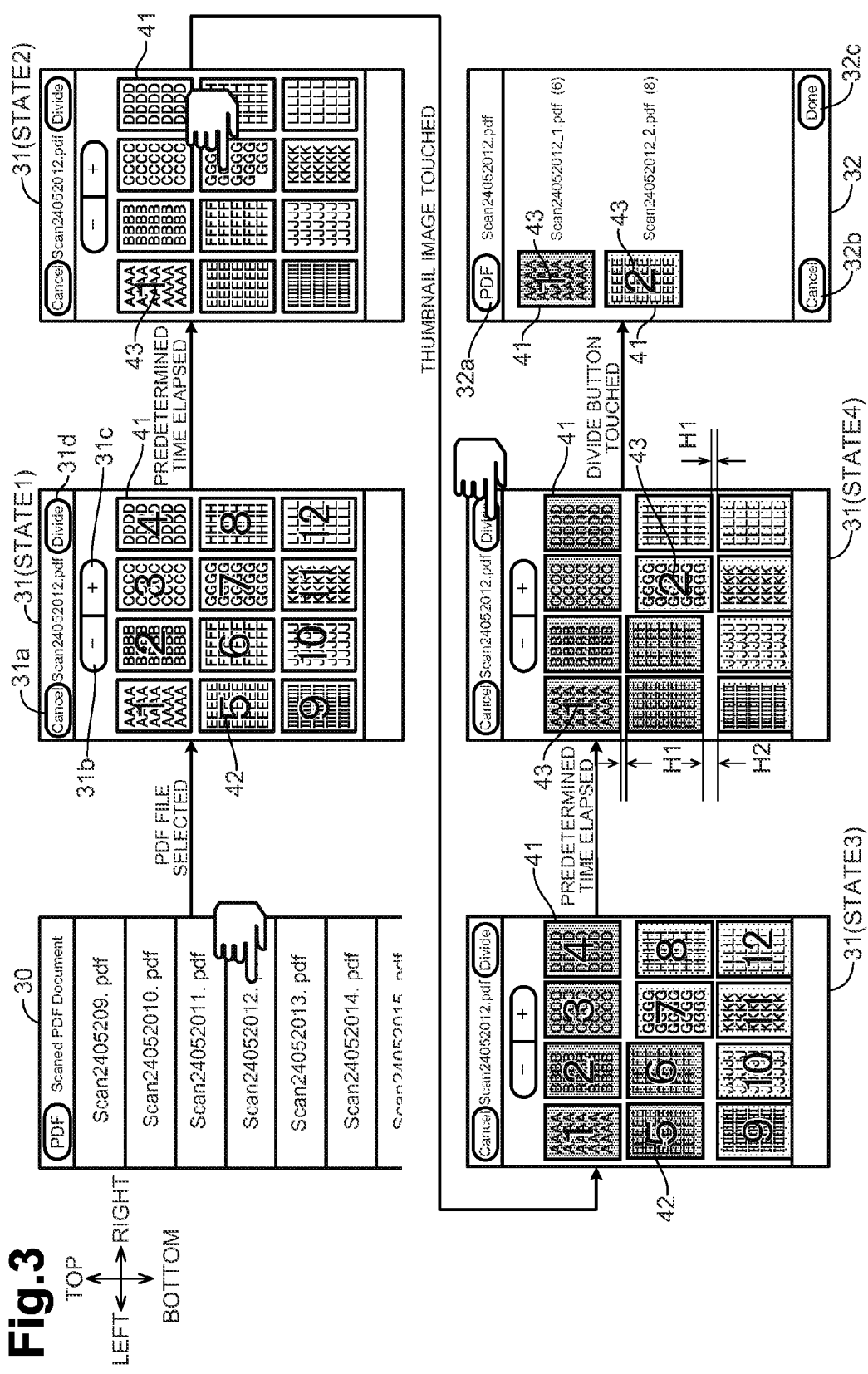
FIG. 3 is a diagram depicting a user interface of a display program according to a first example embodiment.

Referring to FIG. 3, the display program 22 may display a file selection screen 30, a thumbnail image matrix display screen 31, and a division check screen 32 in the display unit 14. The display program 22 may also display other screens, e.g., a function selection screen configured to let users select a function to display thumbnail images in a matrix, and a folder selection screen configured to let users select a folder storing the electronic file 23 that is to be viewed. The detailed description of the function selection screen and the folder selection screen is omitted herein.

The file selection screen 30 may be a screen configured to display the electronic files 23 to be viewed. The display program 22 may receive a user's selection of the electronic file 23 to be viewed. A folder storing PDF files received from the image scanner 7 may be selected in the folder selection screen (not depicted). The file selection screen 30 may display a list of names of the PDF files.

When a user selects any one of the PDF files in the file selection screen 30, the display program 22 may display the thumbnail image matrix display screen 31 in the display unit 14. Then, the display program 22 may display thumbnail images 41 of pages contained in the selected PDF file in the thumbnail image matrix display screen 31 like a state 1. The thumbnail image may be an example of an image. In some examples, the thumbnail image may be smaller version of a full-sized image. In the state 1 of the thumbnail image matrix display screen 31, reference numeral 42 may be applied to only one thumbnail image. For example, reference numeral 42 may be a page number or other identifier applied to the thumbnail image.

The thumbnail images 41 may be displayed in a predetermined order in a matrix in the thumbnail image matrix display screen 31. More specifically, the display program 22 may display the thumbnail images 41 of pages sequentially from the left to the right and from the top to the bottom in ascending order of page number. In one example, when the thumbnail images 41 of pages are displayed to the right end of the thumbnail image matrix display screen 31, the thumbnail images 41 of the following pages may be displayed sequentially from the left to the right of a next new line in the thumbnail image matrix display screen 31 in ascending order of the page number.

The thumbnail image matrix display screen 31 may be scrollable up and down in the top-bottom direction. When there are many the thumbnail images 41 to be displayed in the thumbnail image matrix display screen 31, a user may scroll the thumbnail image matrix display screen 31 up or down to sequentially view all thumbnail images 41 in the thumbnail image matrix display screen 31.

When the thumbnail images 41 are displayed in the thumbnail image matrix display screen 31, the display program 22 may display or indicate on each thumbnail image 41 a page number 42 corresponding to the page of the thumbnail image 41 for a predetermined period of time (e.g., one second) in the thumbnail image matrix display screen 31, like in state 1. In the state 1 of the thumbnail image matrix display screen 31, reference numeral 42 may be applied to only one page. Display or indication of the reference numeral 42 (e.g., a page number) may help users to intuitively determine the page to which each thumbnail image 41 corresponds. The page number may be an example of an image number.

When the predetermined period of time has elapsed, the display program 22 may hide the reference numeral 42 from view. The display program 22 may display or indicate predetermined information 43 at the first page of the thumbnail image 41 in a group in the thumbnail image matrix display screen 31, like a state 2. More specifically, immediately after the thumbnail image matrix display screen 31 is displayed, all thumbnail images 41 displayed in the thumbnail image matrix display screen 31 may belong to a first group. Accordingly, the display program 22 may display or indicate "1" representing the first group, on the thumbnail image 41 of the first page. The numeral representing a group may be an example of the predetermined information. The numeral representing a group may be displayed or indicated preferably in a color different from the color in which the page number 42 may be displayed.

In state 2 of the thumbnail image matrix display screen 31, a user may designate a group dividing position by touching the thumbnail image 41 of a page other than the first page, to divide the displayed thumbnail images 41 into groups. For example, a user may wish to divide the thumbnail images 41 into two groups, e.g., a first group comprising the thumbnail images 41 of the first to the sixth pages and a second group comprising the thumbnail images 41 of the seventh and subsequent pages. In this case, a user may touch the thumbnail image 41 of the seventh page, which may identify the first page of the second group.

When the thumbnail image 41 of the seventh page is touched, the display program 22 may obtain the coordinates of the position of the touched thumbnail image 41, and may accept the position between the thumbnail images 41 of the seventh page and its immediately preceding page, i.e., the sixth page, as the group dividing position. The display program 22 may identify images to be grouped, based on the group dividing position. The display program 22 may change the state of the thumbnail image matrix display screen 31 to a state 3 and then, after a lapse of a predetermined period of time, to a state 4. The state 4 and then the state 3 will be described.

For example, when the thumbnail image 41 of the seventh page is touched in the state 2 of the thumbnail image matrix display screen 31, the display program 22 may separately display the first group comprising the thumbnail images 41 of the first to the sixth pages and the second group comprising the thumbnail images 41 of the seventh and subsequent pages in the thumbnail image matrix display screen 31, like the state 4, by performing processes (a)-(c) for grouping, as described below.

(a) Predetermined Information Indication on Thumbnail Image 41 of a First Page of Each Group The display program 22 may display or indicate a numeral "1" representing a group number on the thumbnail image 41 of the first page of the first group, e.g., the thumbnail image 41 of the first page (page 1). Similarly, the display program 22 may display or indicate a numeral "2" representing a group number on the thumbnail image 41 of the first page of the second group, e.g., the thumbnail image 41 of the seventh page.

(b) Changes of Space Between Images

The display program 22 may provide more space in the top-bottom direction between groups than a space in the top-bottom direction between the thumbnail images 41 belonging to the same group. For example, a space in the top-bottom direction between the thumbnail images 41 belonging to the first group may be defined as a space H1. Similarly, a space in the top-bottom direction between the thumbnail images 41 belonging to the second group may also be defined as the space H1. The display program 22 may make a space H2 between groups wider than the space H1. The space H2 may be, for example, more than twice as much as the space H1 in order for users to readily identify the boundary of the groups.

A reason for increasing the space in the top-bottom direction may be that the thumbnail images 41 may be scrolled in the top-bottom direction in the thumbnail image matrix display screen 31, as described above. If the space is increased in the left-right direction, the sizes of the thumbnail images 41 may have to be reduced by an amount that the space is increased in the left-right direction, because the thumbnail images 41, in some examples, might not be scrolled in the left-right direction. In the example embodiment, the direction in which the thumbnail images 41 are scrolled may be the same as the direction in which a space is increased. Therefore, sufficient space between groups may be maintained, without reducing the sizes of the thumbnail images 41.

When the thumbnail images 41 are scrolled in the left-right direction, more space may be provided in the left-right direction between groups than a space in the left-right direction between the thumbnail images 41 belonging to the same group. In this case, the thumbnail images 41 may be arranged in a matrix, for example, in a vertical direction from the top to the bottom and from the left to the right in an ascending order of the page number. When the thumbnail images 41 are displayed to the bottom of the thumbnail image matrix display screen 31, the thumbnail images 41 of the following pages may be vertically displayed on the next right column from the top to the bottom.

(c) Color Filtering in Different Colors

The display program 22 may perform, e.g., blue, color filtering on the thumbnail images 41 belonging to the first group. When the blue color filtering is performed on the thumbnail image 41, the thumbnail image 41 may become a generally bluish image. The display program 22 may perform, e.g., red, color filtering on the thumbnail images 41 belonging to the second group. When the red color filtering is performed on the thumbnail image 41, the thumbnail image 41 may become a generally reddish image. The filtering colors may be determined, as appropriate, so as to differentiate between groups.

When the processes (a)-(c) are executed for grouping, a user may be able to visually check or recognize the results of grouping of the thumbnail images 41 that may be divided at the group dividing position designated by a user.

When the thumbnail image 41 is touched, the display program 22 may execute the processes (b) and (c). The display program 22 might not execute the process (a) until a predetermined period (e.g., 1 second) has elapsed. Until the process (a) is executed, the display program 22 may display the page number 42 corresponding to the page of the thumbnail image 41 on each thumbnail image 41 in the thumbnail image matrix display screen 31, like the state 3. Thus, users may intuitively understand the page number of pages of each group. As the predetermined period has elapsed, the display program 22 may execute the process (a). Accordingly, a state of the thumbnail image matrix display screen 31 may change to the state 4.

When a user checks a grouping result in the thumbnail image matrix display screen 31 as in state 4, and determines that the result is not what the user wants, the user may instruct a cancellation of the group dividing position. An instruction of the cancellation of the group dividing position may be provided by designating the group dividing position again. For example, in the above-described example case, a user may instruct a cancellation of the group dividing position by touching the thumbnail image 41 of the seventh page again. When a cancellation of the group dividing position is instructed, the display program 22 may change a state of the thumbnail image matrix display screen 31 back to state 2.

In another example, when a user checks a grouping result in the thumbnail image matrix display screen 31 as in state 4, and determines that the result is not what the user wants, the user may divide the thumbnail images 41 into groups at a new group dividing position by touching the thumbnail image 41 of a page other than the first page of the second group (excluding the thumbnail image 41 of page 1). In some examples, the display program 22 might not divide the thumbnail images 41 into three or more groups. Therefore, the display program 22 may discard or cancel the currently designated or accepted group dividing position.

The display program 22 may display a cancel button 31a, a minus (−) button 31b, a plus (+) button 31c, and a divide button 31d in the thumbnail image matrix display screen 31.

The cancel button 31a may be a button to end the display program 22.

The minus (−) button 31b may be a button to reduce the size of the thumbnail images 41 to a next smaller size.

The plus (+) button 31c may be a button to increase the size of the thumbnail image 41 to a next larger size.

The divide button 31*d* may be a button to display the division check screen 32. The divide button 31*d* may become operative when the thumbnail images 41 are divided into groups.

When a user touches the divide button 31*d*, the display program 22 may display the division check screen 32. The division check screen 32 may be a screen to ask a user whether pages contained in the PDF file may be stored in separate files according to groups.

A name of a file containing one or more respective pages belonging to each group may be displayed in the division check screen 32. The display program 22 may automatically generate a file name. More specifically, for a file containing pages belonging to the first group, the display program 22 may generate the file name by adding an underscore (i.e., "_") that may be a delimiter and a "1" representing the first group following the original name of the file selected in the file selection screen 30. Similarly, for a file containing pages belonging to the second group, the display program 22 may be generate a file name by adding an underscore (i.e., "_") that may be a delimiter and a "2" representing the second group following the original file name.

The display program 22 may display the thumbnail image 41 of the first page of the file before each file name. The thumbnail images 41 may be displayed in the division check screen 32 in the same state as the state 4 of the thumbnail image matrix display screen 31. For example, color filtering may be applied to the thumbnail images 41 according to groups and a numeral representing a group may be displayed or indicated on each of the thumbnail images 41.

The display program 22 may display the number of pages put in parentheses "( )" after each file name.

The display program 22 may display a PDF button 32*a*, a cancel button 32*b*, and a done button 32*c* in the division check screen 32.

The PDF button 32*a* may be a button to make the division check screen 32 return to the thumbnail image matrix display screen 31, e.g., state 4, without storing the divided groups of thumbnail images 41 divided into separate files.

The cancel button 32*b* may be a button to end the display program 22 without storing the divided groups of thumbnail images 41 divided into separate file.

The done button 32*c* may be a button to receive a user's instruction of storing pages contained in one PDF file in separate files according to groups. When a user touches the done button 32*c*, the display program 22 may store pages contained in the PDF file selected in the file selection screen 30 in separate files according to groups made in the thumbnail image matrix display screen 31. The display program 22 may delete the original or source PDF file after the pages are stored in separate files.

(3-2) Processing of Display Program

The display program 22 may be an event-driven program. When an event occurs, the display program 22 may execute processing associated with the event (a so-called event handler). Processing to be performed by the display program 22 will be described according to events.

(3-2-1) Displaying Events on Thumbnail Image Matrix Display Screen

Displaying events on the thumbnail image matrix display screen 31 may occur when a file is selected on the file selection screen 30.

Figure 4:
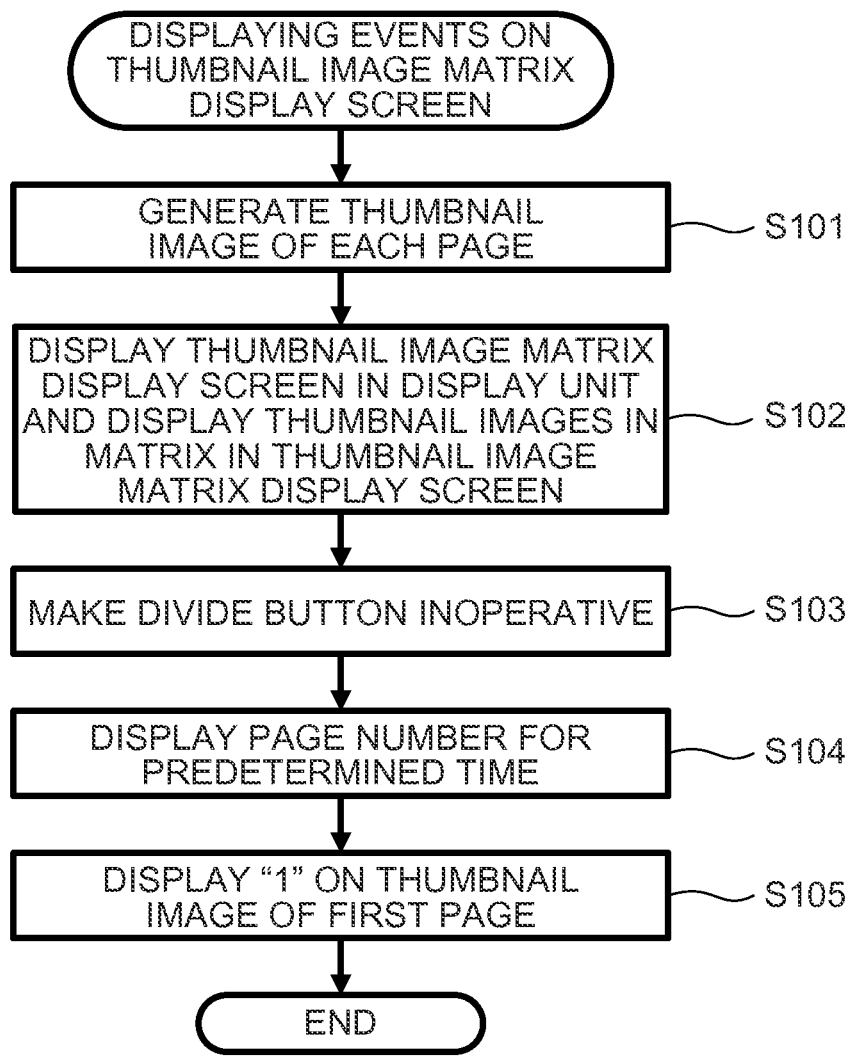
FIG. 4 is a flowchart according to the first example embodiment, depicting processing performed when displaying events on a thumbnail image matrix display screen occurs.

Referring to FIG. 4, processing when displaying events on the thumbnail image matrix display screen 31 occur will be described. In S101, the display program 22 may read pages contained in the PDF file selected in the file selection screen 30 and generate the thumbnail image 41 of each page.

In S102, the display program 22 may display the thumbnail image matrix display screen 31 in the display unit 14. The display program 22 may display the thumbnail images 41 generated in S101 in the predetermined order in a matrix, as described above, in the thumbnail image matrix display screen 31. S102 may be an example of an image displaying process.

In S103, the display program 22 may make the divide button 31*d* inoperative (e.g., a user is not allowed to select or otherwise operate the divided button 31*d*).

In S104, the display program 22 may display or indicate the page number 42 corresponding to the page of the thumbnail image 41 on each thumbnail image 41 for the predetermined period of time.

In S105, the display program 22 may display or indicate the predetermined information, e.g., "1", on the thumbnail image 41 of the first page (page 1).

(3-2-2) Events that May Occur on Thumbnail Image Matrix Display Screen

Next, events that may occur on the thumbnail image matrix display screen 31 and processing that may be performed when the events occur will be described.

(3-2-2-1) Touch Event on Thumbnail Image

A touch event on the thumbnail image 41 may occur when a user touches the thumbnail image 41 on the thumbnail image matrix display screen 31.

Figure 5:
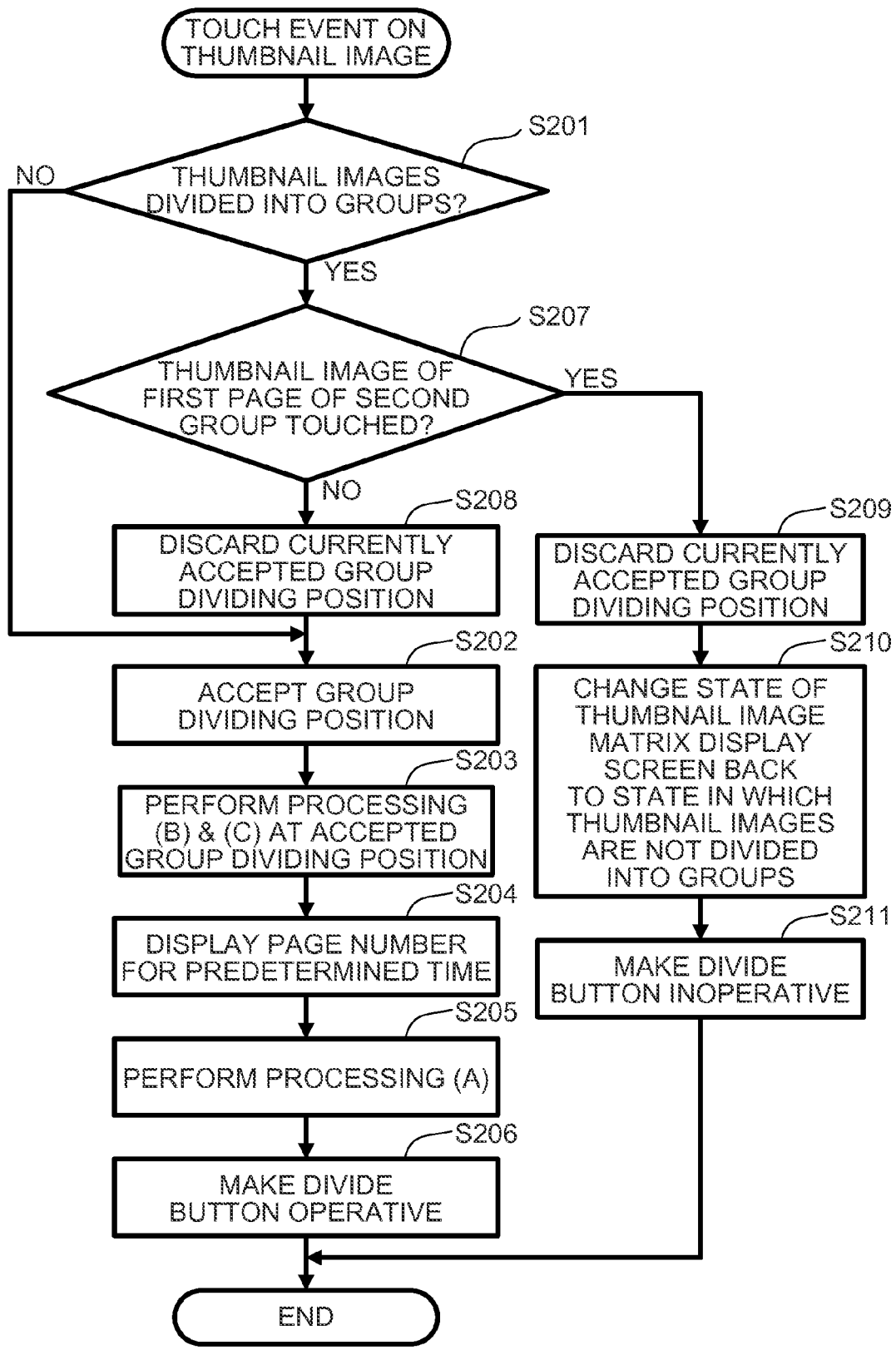
FIG. 5 is a flowchart according to the first example embodiment, depicting processing performed when a touch event on a thumbnail image occurs.

Referring to FIG. 5, processing performed when a touch event on the thumbnail image 41 occurs will be described. The following processing might not be performed when the thumbnail image 41 of the first page (page 1) is touched.

In S201, the display program 22 may determine whether the thumbnail images 41 displayed in the thumbnail image matrix display screen 31 have been already divided into groups. When the displayed thumbnail images 41 have not yet been divided into groups, the display program 22 may proceed to S202. When the displayed thumbnail images 41 have been already divided into groups, the display program 22 may proceed to S207.

In S202, the display program 22 may accept a position between the thumbnail image 41 that a user touches and an immediately preceding thumbnail image 41 thereof as the group dividing position.

In S203, the display program 22 may perform processes (b) and (c) at the accepted group dividing position.

In S204, the display program 22 may display the page number 42 corresponding to the page of the thumbnail image 41 on each thumbnail image 41 for the predetermined period of time.

In S205, the display program 22 may perform process (a). S202 and S205 may be examples of result displaying processes.

In S206, the display program 22 may make the divide button 31*d* operative.

In S207, the display program 22 may determine whether the thumbnail image 41 that is touched is the thumbnail image 41 of the first page of the second group. When the display program 22 determines that the touched thumbnail image 41 is the thumbnail image 41 of a page other than the first page of the second group, the display program 22 may determine that a new group dividing position different from the currently accepted group dividing position is designated. Then, the display program 22 may proceed to S208. When the display program 22 determines that the touched thumbnail image 41 is the thumbnail image 41 of the first page of the second group, the display program 22 may determine that cancellation of the currently accepted group dividing position is instructed. Then, the display program 22 may proceed to S209.

In S208, the display program 22 may discard or cancel the currently accepted group dividing position and may proceed to S202.

In S209, the display program 22 may discard or cancel the currently accepted group dividing position. S209 may be an example of a cancellation accepting process.

In S210, the display program 22 may change a state of the thumbnail image matrix display screen 31 back to state 2 in which the thumbnail images 41 might not be divided or shown as being divided into groups. S210 may be an example of a cancellation process.

In S211, the display program 22 may make the divide button 31*d* inoperative.

(3-2-2-2) Touch Event on Divide Button

A touch event on the divide button 31*d* may occur when a user touches the divide button 31*d* on the thumbnail image matrix display screen 31.

Figure 6:
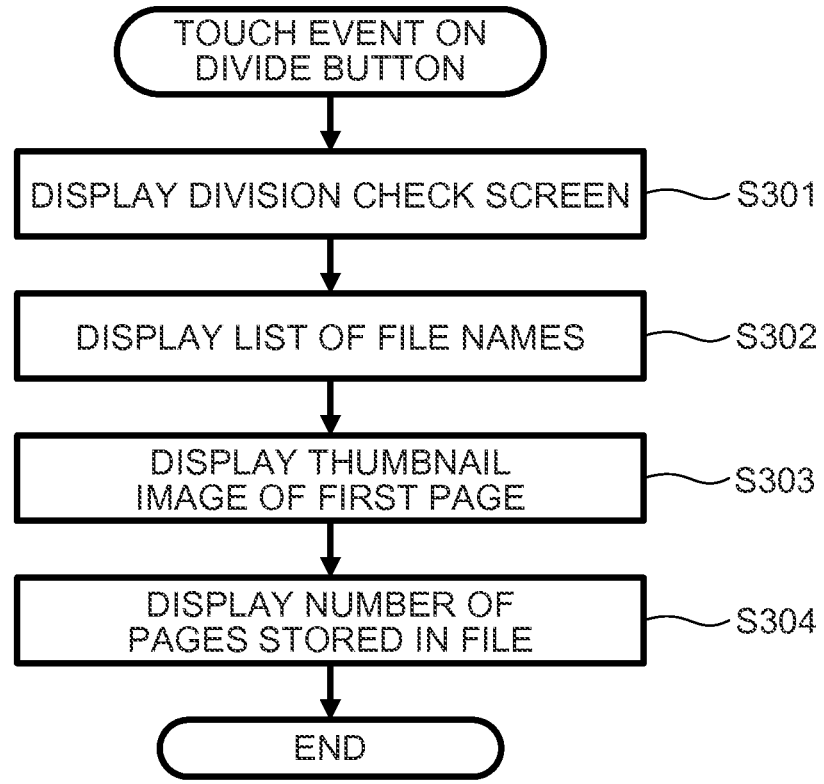
FIG. 6 is a flowchart according to the first example embodiment, depicting processing performed when a touch event on a divide button occurs.

Referring to FIG. 6, processing performed when a touch event on the divide button 31*d* occurs will be described.

In S301, the display program 22 may display the division check screen 32.

In S302, the display program 22 may generate a name of a file storing one or more respective pages belonging to each group. The display program 22 may display a list of the generated file names on the division check screen 32.

In S303, the display program 22 may display the thumbnail image 41 of the first page of the group stored in a file with the file name following the thumbnail image 41. The thumbnail image 41 displayed in the state 4 of the thumbnail image matrix display screen 31 may be used.

In S304, the display program 22 may display the number of pages stored in the file with the number of pages put in parentheses after each file name.

(3-2-2-3) Other Events on Thumbnail Image Matrix Display Screen

In the thumbnail image matrix display screen 31, other touch events, e.g., touch events on the cancel button 31*a*, the minus (−) button 31*b*, and on the plus (+) button 31*c* may occur. Processing performed when those buttons 31*a*, 31*b*, and 31*c* are touched is described above.

(3-2-3) Events that May Occur in Division Check Screen

Next, events that may occur in the division check screen 32 and processing that may be performed when the events occur will be described.

(3-2-3-1) Touch Event on Done Button

A touch event on the done button 32*c* may occur when a user touches the done button 32*c* in the division check screen 32.

When a touch event on the done button 32*c* occurs, the display program 22 may divide or split pages contained in the PDF file selected in the file selection screen 30 into groups designated in the thumbnail image matrix display screen 31 and store one or more respective pages belonging to each group in a respective file.

A process of receiving a touch of the done button 32*c* may be a storage instruction receiving process. A process of storing pages in the respective files may be an example of a storing process.

(3-2-3-2) Other Events on Division Check Screen

In the division check screen 32, other touch events, e.g., touch events on the PDF button 32*a* and the cancel button 32*b* may occur. Processing performed when those buttons 32*a* and 32*b* are touched is described above.

(4) Effects of Embodiment

When the display program 22 accepts a user's designation of the group dividing position on the thumbnail image matrix display screen 31, the display program 22 may divide the thumbnail images 41 displayed in the thumbnail image matrix display screen 31 into groups at the group dividing position and display the thumbnail images 41 in groups. Accordingly, users might not have to perform an operation for checking the result of grouping, separately from an operation of designating the group dividing position. Therefore, the display program 22 may increase the convenience of users when the thumbnail images 41 are divided into groups.

Further, the display program 22 may display or indicate a numeral representing a group number on the thumbnail image 41 of the first page of each group. Therefore, users may be able to readily check the result of grouping of the thumbnail images 41.

Further, as to the space in the top-bottom direction between the thumbnail images 41, the display program 22 may make the space H2 between groups wider than the space H1 between the thumbnail images 41 belonging to the same group. Therefore, users may be able to readily check the result of grouping of the thumbnail images 41.

Further, the display program 22 may perform color filtering on the thumbnail images 41 according to groups. Therefore, users may be able to readily check the result of grouping of the thumbnail images 41.

Further, when a user does not like the result of grouping at his/her designated group dividing position, the display program 22 may redivide the thumbnail images 41 into groups as the user designates another group dividing position.

Further, the display program 22 may store or save pages in separate files according to groups.

Further, the display program 22 may display or indicate the page number 42 corresponding to the page of the thumbnail image 41 on each thumbnail image 41 for the predetermined period of time, after the thumbnail images 41 are displayed. Therefore, users may be able to readily designate a group dividing position.

Further, the display program 22 may display or indicate the page number 42 corresponding to the page of the thumbnail image 41 on each thumbnail image 41 for the predetermined period of time, after the thumbnail images 41 are displayed in groups. Therefore, users may be able to more readily determine the result of grouping of the thumbnail images 41 (e.g., before the splitting or dividing into separate files occurs).

Further, the display program 22 may cancel the group dividing position designated by a user.

Further, the display program 22 may accept the cancellation of the group dividing position when the same position as the currently designated or accepted group dividing position is designated again. Therefore, users may be able to intuitively perform cancellation of the group dividing position.

Further, according to the display program 22, users may be able to designate a group dividing position by designating the thumbnail image 41.

<Second Example Embodiment>

Figure 7:
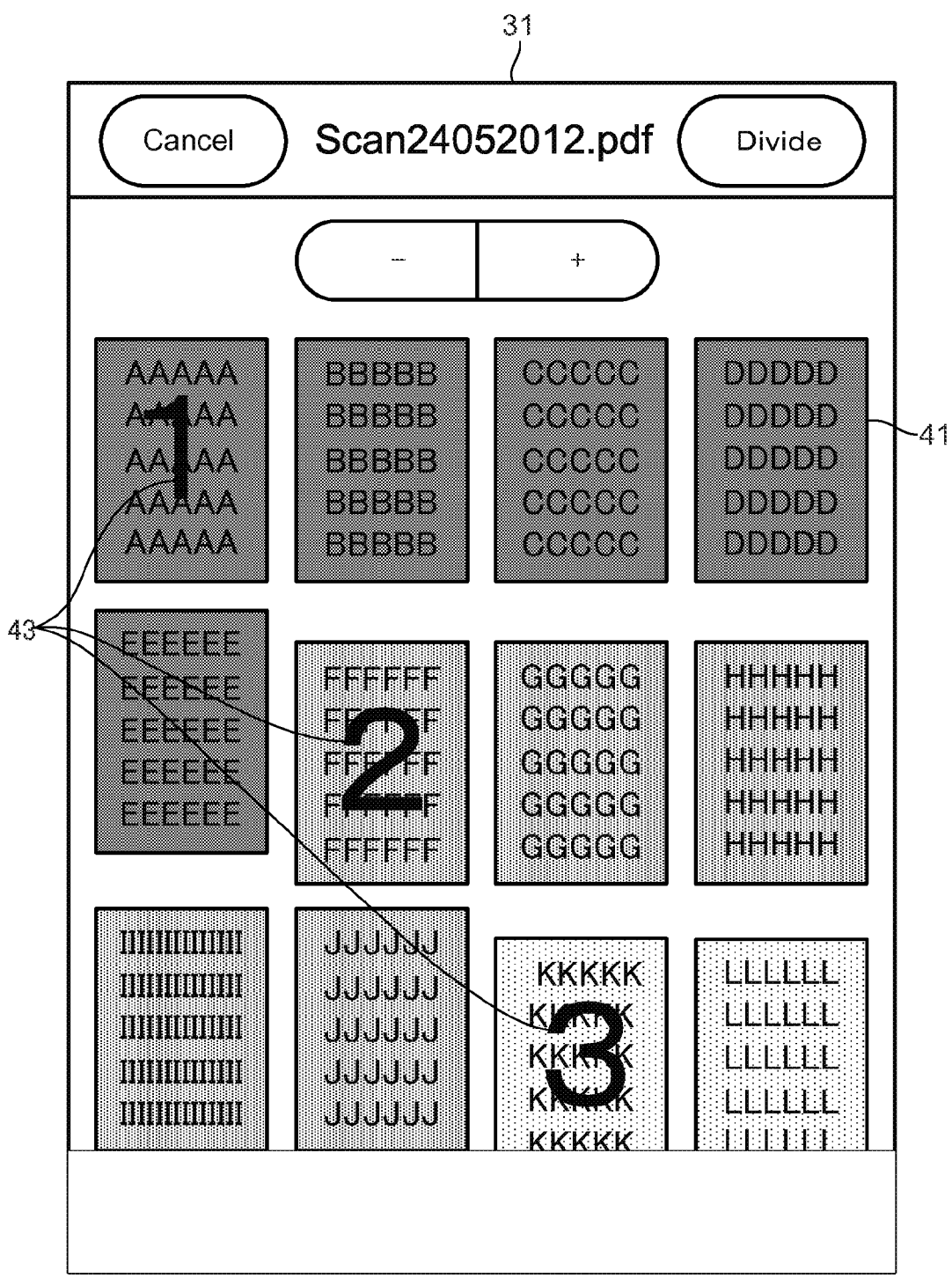
FIG. 7 is a diagram depicting a thumbnail image matrix display screen according to a second example embodiment.

A second example embodiment will be described referring to FIGS. 7 and 8.

In the first example embodiment, the display program 22 may divide the thumbnail images 41 into two groups. In the second example embodiment, the display program 22 may divide the thumbnail images 41 into three or more groups, as depicted in FIG. 7.

More specifically, in the second example embodiment, a user may designate a new group dividing position as the user touches the thumbnail image 41 of a page other than the first page of a group in a state in which the thumbnail images 41 are divided into groups.

A touch event on the thumbnail image 41 according to the second example embodiment will be described referring to FIG. 8. Like reference numerals may be used for like corresponding processes in FIGS. 5 and 8 and a detailed description thereof with respect to the second example embodiment may be omitted herein.

In S401, the display program 22 may determine whether the thumbnail images 41 displayed in the thumbnail image matrix display screen 31 have been already divided into groups. When the display program 22 determines that the thumbnail images 41 displayed in the thumbnail image matrix display screen 31 have not been divided into groups, the display program 22 may proceed to S402. When the display program 22 determines that the thumbnail images 41 displayed in the thumbnail image matrix display screen 31 have been already divided into groups, the display program 22 may proceed to S404.

In S402, the display program 22 may accept the position between the thumbnail image 41 that the user has touched and the immediately preceding thumbnail image 41 thereof as a group dividing position.

In S403, the display program 22 may execute processes (b) and (c) at the accepted group dividing position.

For example, when a user touches the thumbnail image 41 in a state in which thumbnail images 41 have not yet been divided into groups, the display program 22 may accept one group dividing position. Accordingly, the display program 22 may divide thumbnail images 41 into two groups in S403.

For example, when a user touches the thumbnail image 41 of a page other than the first page of a group in a state in which the thumbnail images 41 have been divided into groups, the display program 22 may determine that a new group dividing position is designated in S404. In S402, the display program 22 may accept the group dividing position designated in S404 as a new group dividing position. In this case, the display program 22 may divide thumbnail images 41 into three or more groups in S403, at the previously accepted one or more group dividing positions and a newly accepted group dividing position.

For example, when a user touches the thumbnail image 41 of a first page of the second or subsequent group in a state in which thumbnail images 41 have been divided into groups, the display program 22 may discard or cancel the group dividing position immediately before the touched thumbnail image 41 in S405. If another group dividing position remains even after the group dividing position immediately before the touched thumbnail image 41 is discarded or cancelled, the display program 22 may execute S403. Therefore, when the thumbnail images 41 are divided into, for example, three groups at the two group dividing positions, the thumbnail images 41 may be divided again into two groups at the group dividing position that may remain without being discarded or cancelled.

In S404, the display program 22 may determine whether the touched thumbnail image 41 is the thumbnail image 41 of the first page of the second or subsequent group. When the display program 22 determines that the touched thumbnail image 41 is the thumbnail image 41 of a page other than the first page of the second or subsequent group, the display program 22 may determine that a new group dividing position is designated and proceed to S402. When the display program 22 determines that the touched thumbnail image 41 is the thumbnail image 41 of the first page of the second or subsequent group, the display program 22 may determine that a cancellation of the group dividing position is instructed and proceed to S405.

In S405, the display program 22 may discard or cancel the group dividing position between the thumbnail image 41 that is touched by a user and its immediately preceding thumbnail image 41.

In S406, the display program 22 may determine whether a currently accepted group dividing position remains. When the display program 22 determines that the currently accepted group dividing position remains, the display program 22 may proceed to S403. When the display program 22 determines that the currently accepted group dividing position does not remain, that is, the number of the currently accepted group dividing positions is zero (0), the display program 22 may proceed to S407.

In S407, the display program 22 may change the thumbnail image matrix display screen 31 back to the state 2 where the thumbnail images 41 are not divided into groups.

When the display program 22 according to the second example embodiment accepts a designation of a new group dividing position in a state in which the thumbnail images 41 are displayed in groups, the display program 22 may display the thumbnail images 41 in groups by dividing the thumbnail images 41 into groups at the previously accepted one or more group dividing positions and a newly accepted group dividing position. Thus, the display program 22 may divide the thumbnail images 41 into three or more groups.

<Third Example Embodiment>

The third example embodiment may be a modification of the second example embodiment. In the second example embodiment, when the thumbnail images 41 are divided into the first group and the second group, a user may divide the first group into two groups or divide the second group into two groups. In the third example embodiment, one of two groups divided at the accepted group dividing position may be fixed. The display program 22 may accept a designation of a group dividing position to divide the other group into groups.

More specifically, when the thumbnail images 41 are divided into the first group and the second group, the display program 22 according to the third example embodiment, may fix the first group. The display program 22 may accept the designation of a group dividing position for the second group. When the thumbnail images 41 are divided into the first group, the second group, and a third group by dividing the second group further into groups, the display program 22 may fix the second group. The display program 22 may accept the designation of a group dividing position for the third group.

In other words, when the thumbnail images 41 are divided into two or more groups, the display program 22 according to the third example embodiment may accept the designation of a group dividing position for the latest or last group.

Figure 8:
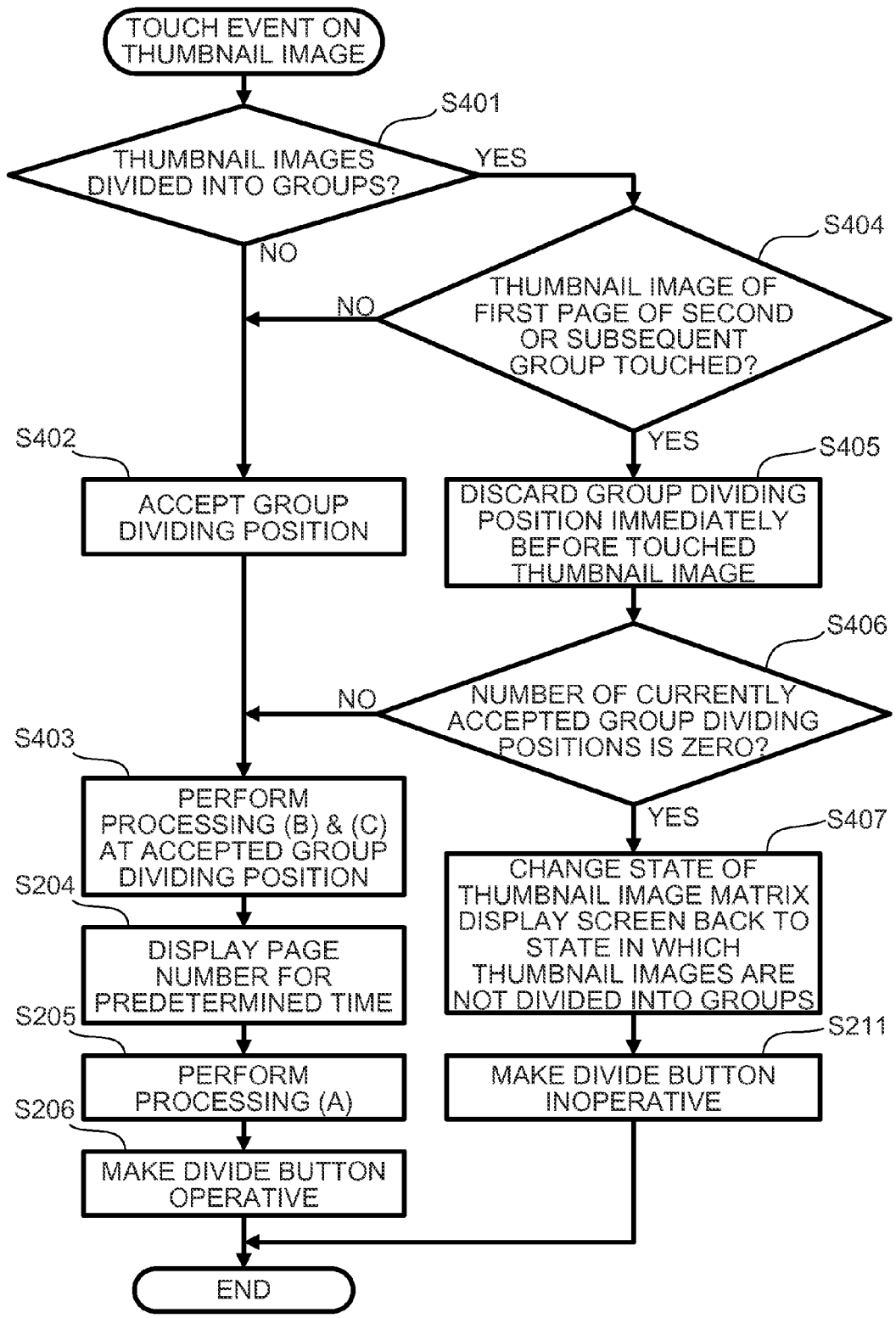
FIG. 8 is a flowchart according to the second example embodiment, depicting processing performed when a touch event on a thumbnail image occurs.

A step to accept the designation of a group dividing position for the last group may be added to FIG. 8. When the display program 22 determines that the touched thumbnail image 41 is the thumbnail image 41 of a page other than the first page of the second or subsequent group in S404, the display program 22 may determine whether the touched thumbnail image 41 belongs to the latest or last group, before proceeding to S402. When the display program 22 determines that the touched thumbnail image 41 belongs to the latest or last group, the display program 22 may proceed to S402. When the display program 22 determines that the touched thumbnail image 41 does not belong to the last group, the processing may end.

Similarly, the display program 22 may accept the cancellation of the group dividing position when the thumbnail image 41 of the first page of the latest or last group is touched.

The display program 22 might not accept the cancellation of the group dividing position, when the thumbnail image 41 of the first page of a group other than the last group is touched.

The display program 22 according to the third example embodiment may fix one of two groups divided at the accepted group dividing position. The display program 22 may accept the designation of the group dividing position to further divide the other one, e.g., the last group, of the two groups. Therefore, by repeatedly dividing the thumbnail images 41 of the last group into two groups, the thumbnail images 41 may be divided into three or more groups.

<Fourth Example Embodiment>

Next, a fourth example embodiment will be described referring to FIG. 9.

In the first example embodiment, the display program 22 may execute processes (a)-(c) for grouping. The display program 22 according to the fourth example embodiment may execute processing (d) for grouping, instead of process (b).

(d) Enclosing Group with Frame

Figure 9:
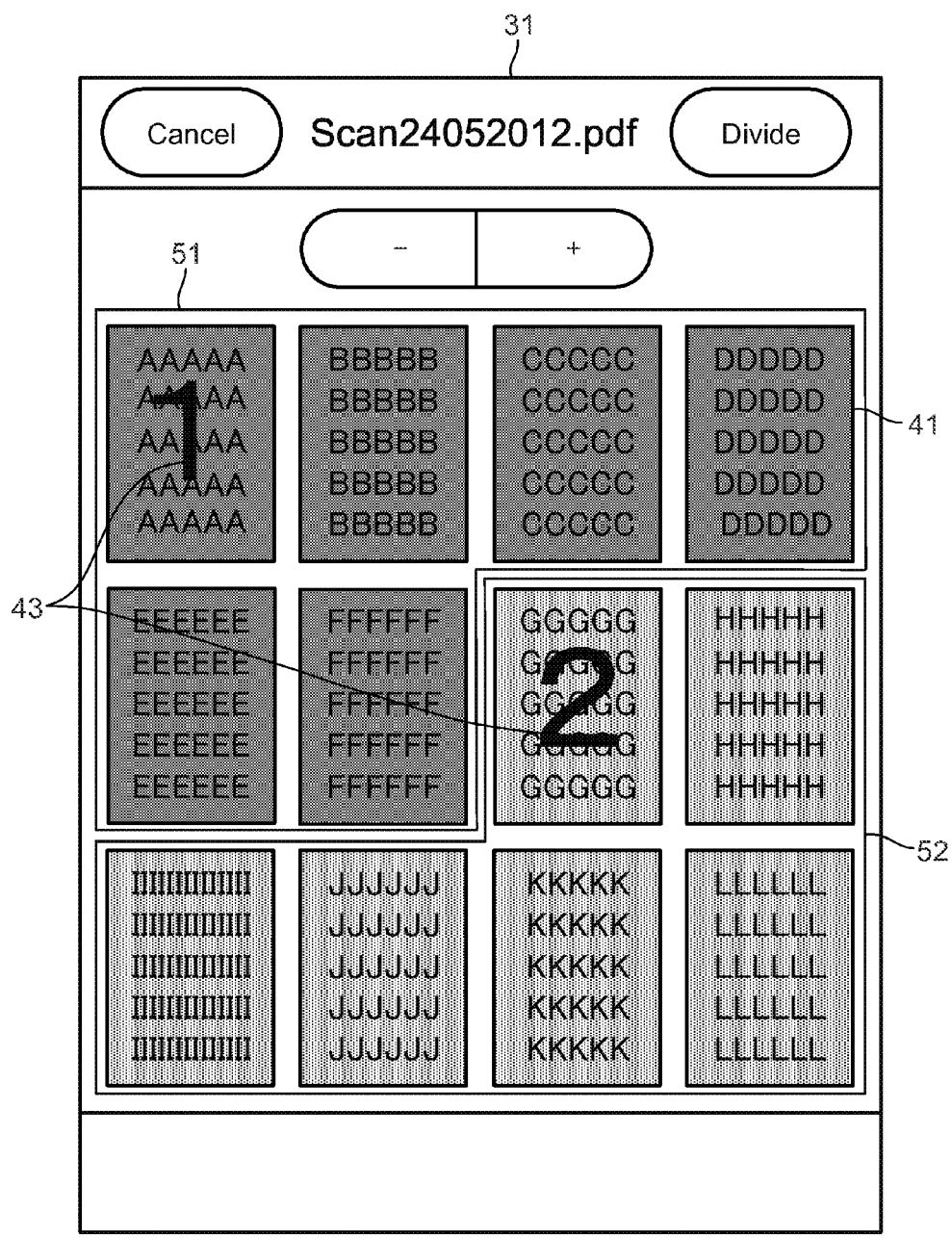
FIG. 9 is a diagram depicting a thumbnail image matrix display screen according to a fourth example embodiment.

Referring to FIG. 9, process (d) will be described. FIG. 9 may depict a state in which the thumbnail images 41 are divided into a first group comprising the thumbnail images 41 of the first to sixth pages and a second group comprising the thumbnail images 41 of the seventh and subsequent pages. The display program 22 may display the thumbnail images 41 of the first to sixth pages enclosed by a frame 51 and display the thumbnail images 41 of the seventh and subsequent pages enclosed by a frame 52.

Other structures in the fourth example embodiment may be substantially the same as those of the first example embodiment.

The display program 22 according to the fourth example embodiment may enclose each group with a frame, e.g., the frames 51, 52. Therefore, users may be able to readily check the result of grouping of the thumbnail images 41.

<Fifth Example Embodiment>

Figure 10:
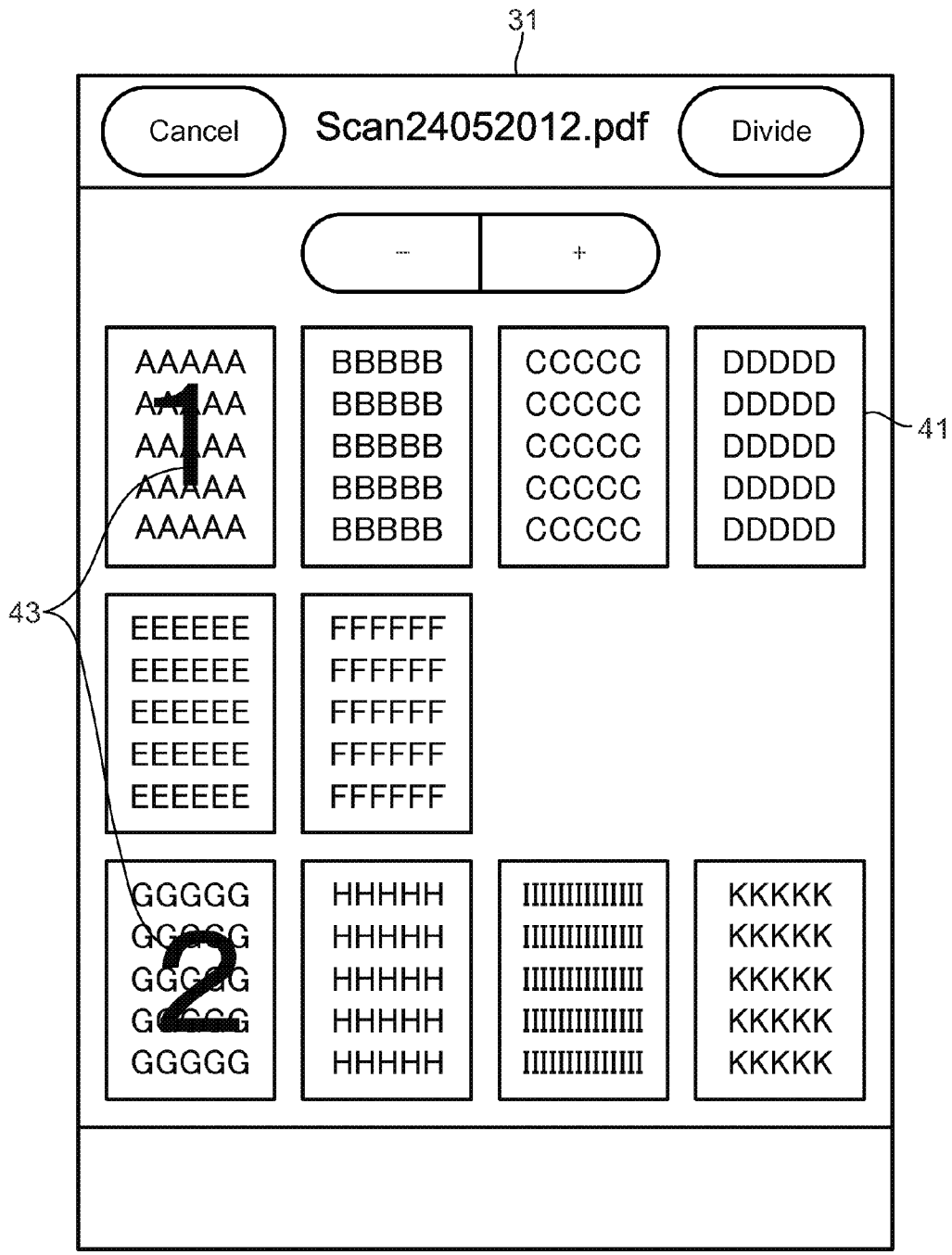
FIG. 10 is a diagram depicting a thumbnail image matrix display screen according to a fifth example embodiment.

Next, a fifth example embodiment will be described referring to FIG. 10.

In the first example embodiment, processes (a)-(c) for grouping may be executed. The display program 22 according to the fifth example embodiment may execute processing (e) for grouping, instead of processes (b) and (c).

(e) Displaying Thumbnail Images 41 by Ending Line at Position Immediately Before Thumbnail Image 41 of First Page of Each of Second or Subsequent Groups Referring to FIG. 10, process (e) for grouping will be described. FIG. 10 may depict a state in which the thumbnail images 41 are divided into a first group comprising the thumbnail images 41 of the first to sixth pages and a second group comprising the thumbnail images 41 of the seventh and subsequent pages. The display program 22 may end a line at a position immediately before the thumbnail image 41 of the seventh page, which may be the first page of the second group.

Other structures of the fifth example embodiment may be substantially the same as those of the first example embodiment.

The display program 22 according to the fifth example embodiment may display the thumbnail images 41 by ending a line at a position immediately before the thumbnail image 41 of the first page of each of the second or subsequent groups. Therefore, users may be able to readily check the result of grouping of the thumbnail images 41.

<Sixth Example Embodiment>

Next, a sixth example embodiment will be described referring to FIG. 11.

In the first example embodiment, the thumbnail images 41 may be sequentially displayed with a matrix from the left to the right and from the top to the bottom. In the sixth example embodiment, the display program 22 may display the thumbnail images 41 in one line, as depicted in FIG. 11. The thumbnail images 41 may be arranged in one line in the top-bottom direction or in the left-right direction. In the example embodiment, the thumbnail images 41 may be arranged in one line in the left-right direction. In this case, a user may scroll the thumbnail images 41 in the left-right direction, to sequentially view all the thumbnail images 41.

Figure 11:
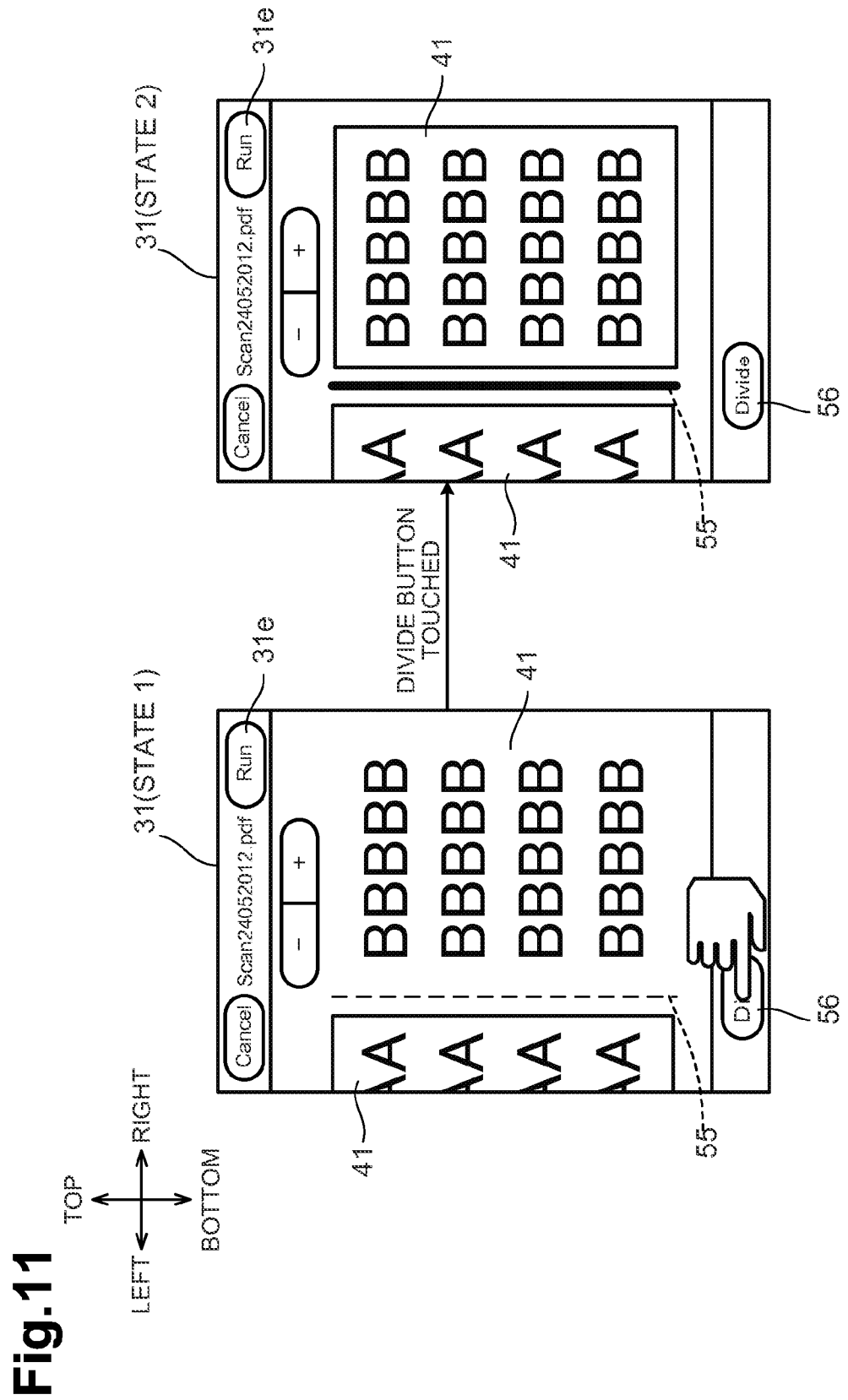
FIG. 11 is a schematic depicting a thumbnail image matrix display screen according to a sixth example embodiment.

The display program 22 according to the sixth example embodiment may display a dividing line 55 in the thumbnail image matrix display screen 31 between each of two adjacent thumbnail images 41, like state 1 in FIG. 11. The display program 22 may display a divide button 56 below each dividing line 55 to let a user select whether the pages of the thumbnail images 41 are divided into groups at the position of the dividing line 55 corresponding to the divide button 56.

Immediately after the thumbnail images 41 are displayed, each dividing line 55 may be in a non-selected state. The dividing line 55 may be displayed or indicated with dashed lines in gray in the non-selected state. A user may scroll the thumbnail images 41 to the right or left, and may touch the divide button 56 for the dividing line 55 where the user wishes to divide the thumbnail images 41 into groups, e.g., between the thumbnail image 41 that may become the last page of the first group and the thumbnail image 41 that may become the first page of the second group. Thus, the dividing line 55 may be selected as the group dividing position. The selected dividing line 55 may be displayed or indicated with a thick solid line in an eye-catching color, e.g., red. Thus, users may be able to readily recognize/identify the group dividing position.

In the sixth example embodiment, one dividing line 55 may be selected at a time. Therefore, when the divide button 56 corresponding to the dividing line 55 is touched after the divide button 56 corresponding to another dividing line 55 is touched, the previously selected dividing line 55 corresponding to the another divide button 56 may be cancelled, and the subsequently selected dividing line 55 corresponding to the divide button 56 may be selected.

When the divide button 56 corresponding to the selected dividing line 55 is touched again, the display program 22 may cancel the selected dividing line 55.

A run button 31e may be a button that may function similar to the divide button 31d according to the first example embodiment.

According to the display program 22 of the sixth example embodiment, users may be able to designate a group dividing position by selecting the dividing line 55 and readily understand/identify the boundary of groups with the dividing line 55.

<Seventh Example Embodiment>

Next, a seventh example embodiment will be described referring to FIG. 12.

The display program 22 according to the seventh example embodiment may display a movable division mark 71 to display the thumbnail images 41 in groups.

Referring to FIG. 12, the display program 22 according to the seventh example embodiment may display or indicate a division button 70 on the thumbnail image matrix display screen 31 like the state 1.

When a user touches the division button 70, the display program 22 may display or indicate the division mark 71 that may be movable between any two of the thumbnail images 41, on the thumbnail image matrix display screen 31, as shown in state 2. For example, the position where the division mark 71 is first displayed or indicated may be predetermined. FIG. 12 illustrates the division mark 71 displayed or indicated between the thumbnail image 41 of the sixth page and the thumbnail image 41 of the seventh page. A process of receiving a touch on the division button 70 may be an example of a start instruction receiving process. A process of displaying the division mark 71 may be an example of a division mark displaying process.

When a user performs a drag operation in which the user slides his/her finger on the thumbnail image matrix display screen 31, like the state 3, while the user keeps touching the division mark 71, the division mark 71 may be moved. A process of receiving a drag operation may be an example of a moving process.

For example, a user may move the division mark 71 between the thumbnail images 41 of the fifth page and the thumbnail image 41 of the sixth page. In this case, the display program 22 may move the division mark 71 between the thumbnail image 41 of the fifth page and the thumbnail image 41 of the sixth page in the thumbnail image matrix display screen 31 like the state 4. Thus, the display program 22 may display a group comprising the thumbnail images 41 of the first to the fifth pages and a group comprising the thumbnail image 41 of the sixth and subsequent pages.

When the group dividing position designated with the division mark 71 is cancelled, a user, for example, may continuously touch the division mark 71 for a predetermined period of time. When the division mark 71 is continuously touched for the predetermined period of time, the display program 22 may display a menu that may ask a user whether the division mark 71 is to be hidden from view. When a user instructs the display program 22 to hide the division mark 71 from view in the menu, the display program 22 may hide the division mark 71 from view and change the state of the thumbnail image matrix display screen 31 back to the state 1 of FIG. 12.

According to the display program 22 of the seventh example embodiment, users may be able to designate a group dividing position by moving the division mark 71.

<Other Example Embodiments>

While the disclosure has been described in detail with reference to the specific embodiments thereof, this is merely an example, and various changes, arrangements and modifications may be applied therein without departing from the spirit and scope of the disclosure.

(1) In the above-described example embodiments, the predetermined information may be displayed or indicated on the thumbnail image 41 of the first page of a group, so that users may visually recognize a group that each thumbnail image 41 belongs to. In another embodiment, the predetermined information may be displayed or indicated on all of the thumbnail images 41. For example, "1" may be indicated on all of the thumbnail images 41 of the first group, and "2" may be indicated on all of the thumbnail images 41 of the second group. Thus, users may more readily check the result of grouping of the thumbnail images 41.

(2) In the first example embodiment, a position between the thumbnail image 41 that is touched and an immediately preceding thumbnail image 41 thereof may be accepted as the group dividing position. In another embodiment, a position between the thumbnail image 41 that is touched and an immediately following thumbnail image 41 thereof may be accepted as the group dividing position.

(3) In the above example embodiments, the thumbnail images 41 of pages contained in the PDF file selected by a user may be displayed in the thumbnail image matrix display screen 31. In another embodiment, an image contained in a different type of file may be displayed in the thumbnail image matrix display screen 31. For example, when JPEG files are stored in a folder, thumbnails of images stored in the JPEG files may be displayed in a matrix.

(4) In the first example embodiment, processes (a)-(c) may be executed for grouping. In another embodiment, one or two processing among processes (a)-(c) may be executed for grouping. Similarly, the number of processing performed for grouping may be reduced for other example embodiments.

(5) In the first example embodiment, when the thumbnail image 41 of a page other than the first page of the second group is touched in a state in which the thumbnail images 41 have been divided into groups, the group dividing position that is currently accepted may be discarded or cancelled and a new group dividing position may be accepted. In another embodiment, when the thumbnail image 41 of a page other than the first page of the second group is touched in a state in which the thumbnail images 41 have been divided into groups, no processing may be executed. In this case, a user may first cancel the currently designated group dividing position and then designate a new group dividing position.

(6) In the above-described example embodiments, pages of the thumbnail images 41 that may be divided into groups may be stored in separate files according to groups. However, processing that may be performed for pages of the thumbnail images 41 divided into groups might not be limited to storage in separate files according to groups. For example, the grouping technique disclosed herein may be applied when pages are divided into groups and pages of a specific group are printed.

(7) In the above-described example embodiments, the information processing apparatus may be the mobile phone 1. However, the information processing apparatus might not be limited to the mobile phone 1 but may be a personal computer or a personal digital assistant.

What is claimed is:

1. A non-transitory computer readable medium storing instructions that, when executed by a processor, cause an information processing apparatus to execute:

displaying a plurality of images of a file on a display unit in an order specified by the file;

receiving, from a user, user input designating a first dividing position when the images are displayed on the display unit;

upon receiving the user input designating the first dividing position, visually distinguishing a first group comprising at least one image of the plurality of images from a second group comprising at least one other image of the plurality of images, wherein the first group and the second group are defined based on the first dividing position, wherein visually distinguishing the first group from the second group is performed prior to dividing the file into a first divided file including the first group and a second divided file including the second group;

overlaying, for a predetermined amount of time upon visually distinguishing the first group from the second group, each of the plurality of images with page number information identifying a position of each of the images within the order specified by the file; and after expiration of the predetermined amount of time, removing the page number information from the plurality of images and overlaying first group number information on one or more images of the first group and overlaying a second group number information on one or more images of the second group, wherein the first group comprises at least two images of the plurality of images, wherein an imaginary line extending in a predetermined direction intersects at least one image of the first group and at least one image of the second group, and wherein visually distinguishing the first group from the second group includes providing a space in the predetermined direction between the first group and the second group larger than a space in the predetermined direction provided between the at least two images included in the first group.

2. The non-transitory computer readable medium according to claim 1, wherein visually distinguishing the first group from the second group includes displaying the at least one image of the first group in a first color and displaying the at least one image of the second group in a second color different from the first color.

3. The non-transitory computer readable medium according to claim 1, wherein visually distinguishing the first group from the second group includes enclosing the first group with a first visual frame and enclosing the second group with a second visual frame.

4. The non-transitory computer readable medium according to claim 1, wherein visually distinguishing the first group from the second group includes displaying the first group on a line extending in a predetermined direction, and displaying the second group beginning at another line extending in the predetermined direction.

5. The non-transitory computer readable medium according to claim 1, wherein the instructions, when executed by the processor, further cause the information processing apparatus to execute:

receiving another user input designating a second dividing position when the first group and the second group are visually distinguished;

modifying the first group and the second group based on the second dividing position; and visually distinguishing the modified first group from the modified second group.

6. The non-transitory computer readable medium according to claim 1, wherein the instructions, when executed by the processor, further cause the information processing apparatus to execute:

receiving another user input designating a second dividing position when the first group and the second group are visually distinguished;

defining a third group comprising at least one image and a fourth group comprising at least one image, wherein the third group and the fourth group are defined from one of the first group and the second group based on the second dividing position; and visually distinguishing the third group, the fourth group, and the other one of the first group and the second group from one another.

7. The non-transitory computer readable medium according to claim 6, wherein the instructions, when executed by the processor, further cause the information processing apparatus to execute:

fixing the first dividing position defining the first group;

receiving another user input designating a second dividing position when the first group and the second group are visually distinguished and the first dividing position is fixed;

defining a third group comprising at least one image and a fourth group comprising at least one image, wherein the third group and the fourth group are defined from the second group based on the second dividing position; and visually distinguishing the third group, the fourth group, and the first group from one another.

8. The non-transitory computer readable medium according to claim 1, wherein the instructions, when executed by the processor, further cause the information processing apparatus to execute:

receiving, from the user when the first group and the second group are visually distinguished, a designation for storing the images included in the file in a plurality of separate files according to the first group and the second group; and storing the first group in a first file and the second group in a second file when the designation is accepted.

9. The non-transitory computer readable medium according to claim 1, wherein the instructions that, when executed by the processor, further cause the information processing apparatus to execute displaying, on each image, an image number for a predetermined period of time after starting to display the plurality of images, wherein the image number indicates a position of the corresponding image in the file.

10. The non-transitory computer readable medium according to claim 1, wherein the instructions, when executed by the processor, further cause the information processing apparatus to execute:

receiving, from the user, a cancelation designation for canceling the first dividing position when the first group and the second group are visually distinguished; and when the cancelation designation is accepted, displaying the plurality of images in a state in which the images are not visually distinguished into the first group and the second group.

11. The non-transitory computer readable medium according to claim 10, wherein the instructions, when executed by the processor, further cause the information processing apparatus to execute accepting the cancelation designation when the first dividing position currently accepted is designated again.

12. The non-transitory computer readable medium according to claim 1, wherein the instructions, when executed by the processor, further cause the information processing apparatus to execute:

receiving, from the user, a designation of an image included in the plurality of images; and defining the first dividing position as one of: a position between the designated image and an immediately preceding image, and a position between the designated image and an immediately following image.

13. The non-transitory computer readable medium according to claim 1, wherein the instructions, when executed by the processor, further cause the information processing apparatus to execute: displaying a dividing line between a pair of adjacent images of the plurality of images; and receiving an input for selecting the dividing line by the user as the first dividing position.

14. The non-transitory computer readable medium according to claim 1, wherein the instructions, when executed by the processor, further cause the information processing apparatus to execute:

displaying a division mark that is movable to positions between any two images of the plurality of images;

receiving, from the user, a designation of a destination of the division mark, wherein the destination of the division mark defines the first division position; and moving the division mark to the destination designated by the user, wherein visually distinguishing the first group from the second group includes displaying the division mark at the first division position.

15. An information processing apparatus comprising:
a processor; and
a storage device storing instructions that, when executed by the processor, cause the information processing apparatus to execute:
displaying a plurality of images of a file on a display unit in an order specified by the file;
receiving, from a user, user input designating a first dividing position when the images are displayed on the display unit;
upon receiving the user input designating the first dividing position, visually distinguishing a first group comprising at least one image of the plurality of images from a second group comprising at least one other image of the plurality of images, wherein the first group and the second group are defined based on the first dividing position, wherein visually distinguishing the first group from the second group is performed prior to dividing the file into a first divided file including the first group and a second divided file including the second group;
overlaying, for a predetermined amount of time upon visually distinguishing the first group from the second group, each of the plurality of images with page number information identifying a position of each of the images within the order specified by the file; and
after expiration of the predetermined amount of time, removing the page number information from the plurality of images and overlaying first group number information on one or more images of the first group and overlaying a second group number information on one or more images of the second group,
wherein the first group comprises at least two images of the plurality of images,
wherein an imaginary line extending in a predetermined direction intersects at least one image of the first group and at least one image of the second group, and
wherein visually distinguishing the first group from the second group includes providing a space in the predetermined direction between the first group and the second group larger than a space in the predetermined direction provided between the at least two images included in the first group.

16. A method comprising:
displaying a plurality of images of a file on a display unit in an order specified by the file;
receiving, from a user, user input designating a first dividing position when the images are displayed on the display unit;
upon receiving the user input designating the first dividing position, visually distinguishing a first group comprising at least one image of the plurality of images from a second group comprising at least one other image of the plurality of images, wherein the first group and the second group are defined based on the first dividing position,
wherein visually distinguishing the first group from the second group is performed prior to dividing the file into a first divided file including the first group and a second divided file including the second group;
overlaying, for a predetermined amount of time upon visually distinguishing the first group from the second group, each of the plurality of images with page number information identifying a position of each of the images within the order specified by the file; and
after expiration of the predetermined amount of time, removing the page number information from the plurality of images and overlaying first group number information on one or more images of the first group and overlaying a second group number information on one or more images of the second group,
wherein the first group comprises at least two images of the plurality of images,
wherein an imaginary line extending in a predetermined direction intersects at least one image of the first group and at least one image of the second group, and
wherein visually distinguishing the first group from the second group includes providing a space in the predetermined direction between the first group and the second group larger than a space in the predetermined direction provided between the at least two images included in the first group.

* * * * *